US012640946B2

(12) United States Patent　　(10) Patent No.:　US 12,640,946 B2
Sekniqi et al.　　　　　　　　(45) Date of Patent:　May 26, 2026

(54) CUSTOMIZED BLOCKCHAIN INFRASTRUCTURE

(71) Applicant: Ava Labs, Inc., New York, NY (US)

(72) Inventors: Kevin Sekniqi, Sunny Isles Beach, FL (US); Emin Gün Sirer, Ithaca, NY (US); Stephen John Buttolph, Brooklyn, NY (US)

(73) Assignee: Ava Labs, Inc., New York, NY (US)

( * ) Notice: Subject to any disclaimer, the term of this patent is extended or adjusted under 35 U.S.C. 154(b) by 106 days.

(21) Appl. No.: 18/464,155

(22) Filed: Sep. 8, 2023

(65) Prior Publication Data

US 2024/0089131 A1　　Mar. 14, 2024

Related U.S. Application Data

(60) Provisional application No. 63/405,322, filed on Sep. 9, 2022.

(51) Int. Cl.
　　*H04L 9/00*　　　　　(2022.01)
(52) U.S. Cl.
　　CPC ..................................... *H04L 9/50* (2022.05)
(58) Field of Classification Search
　　None
　　See application file for complete search history.

(56) References Cited

U.S. PATENT DOCUMENTS

| | | | | |
|---|---|---|---|---|
| 11,379,429 | B1 * | 7/2022 | Lupowitz | G06F 16/1805 |
| 2019/0018887 | A1 * | 1/2019 | Madisetti | H04L 9/3247 |
| 2019/0058581 | A1 * | 2/2019 | Wood | H04L 9/3239 |
| 2020/0058020 | A1 * | 2/2020 | Natarajan | H04L 9/50 |
| 2020/0074464 | A1 * | 3/2020 | Trevethan | G06Q 20/38215 |
| 2020/0117733 | A1 * | 4/2020 | Mueller | G06F 16/258 |
| 2020/0177373 | A1 * | 6/2020 | Komandur | H04L 9/3247 |
| 2021/0014042 | A1 * | 1/2021 | Sivathanu | H04L 9/0637 |
| 2021/0132973 | A1 * | 5/2021 | Nair | H04L 61/3025 |
| 2022/0092599 | A1 * | 3/2022 | Sofaer | G06Q 20/0655 |
| 2022/0174059 | A1 * | 6/2022 | Fields | H04L 9/3239 |
| 2022/0215469 | A1 * | 7/2022 | Jette | G06F 9/45558 |
| 2022/0335421 | A1 * | 10/2022 | Ma | G06F 21/64 |
| 2022/0335423 | A1 * | 10/2022 | Ma | G06Q 20/42 |
| 2022/0335494 | A1 * | 10/2022 | Ma | G06Q 30/0609 |
| 2023/0419327 | A1 * | 12/2023 | Wu | G06Q 20/4016 |
| 2024/0333521 | A1 * | 10/2024 | Kaplan | H04L 9/3239 |

OTHER PUBLICATIONS

International Search Report and Written Opinion for International Patent Application No. PCT/US2023/073717, mailed Dec. 12, 2023 (13 pages).

* cited by examiner

*Primary Examiner* — Jeffrey R Swearingen
(74) *Attorney, Agent, or Firm* — McDermott Will & Schulte LLP

(57)　　　　　ABSTRACT

Various aspects of the subject technology relate to systems, methods, and machine-readable media for generating a heterogeneous network of blockchains. The method includes generating a platform blockchain having a single replicated state machine. The method includes generating at least one subnet based in part on the platform blockchain, the subnet including at least one blockchain, the generating causing bonding or burning of a base asset of the platform blockchain. The method includes specifying validators for the at least one subnet. The platform blockchain includes a source of truth for transactions across the subnets.

18 Claims, 10 Drawing Sheets

700

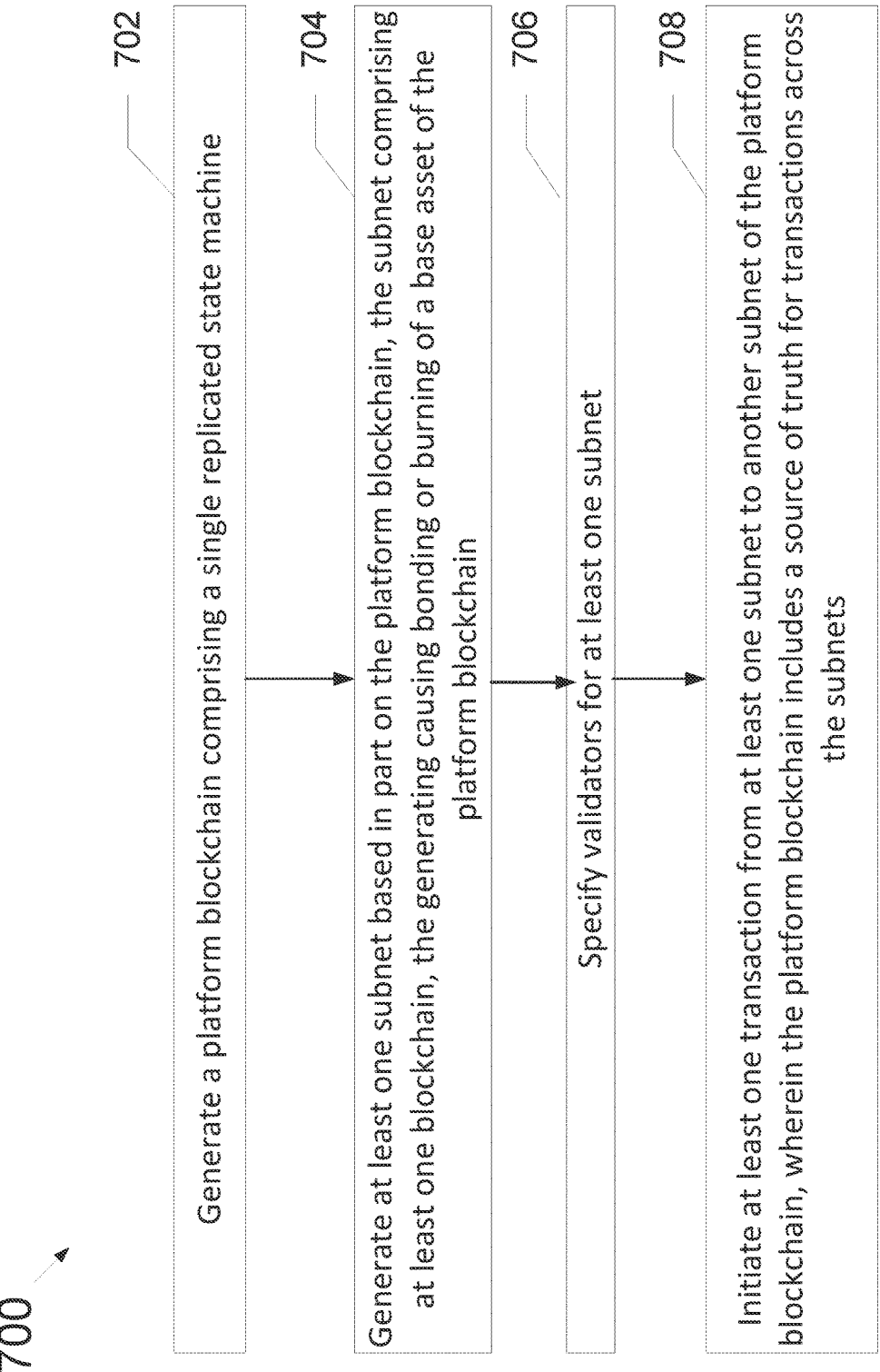

700

702 — Generate a platform blockchain comprising a single replicated state machine 704 — Generate at least one subnet based in part on the platform blockchain, the subnet comprising at least one blockchain, the generating causing bonding or burning of a base asset of the platform blockchain 706 — Specify validators for at least one subnet 708 — Initiate at least one transaction from at least one subnet to another subnet of the platform blockchain, wherein the platform blockchain includes a source of truth for transactions across the subnets

FIG. 7

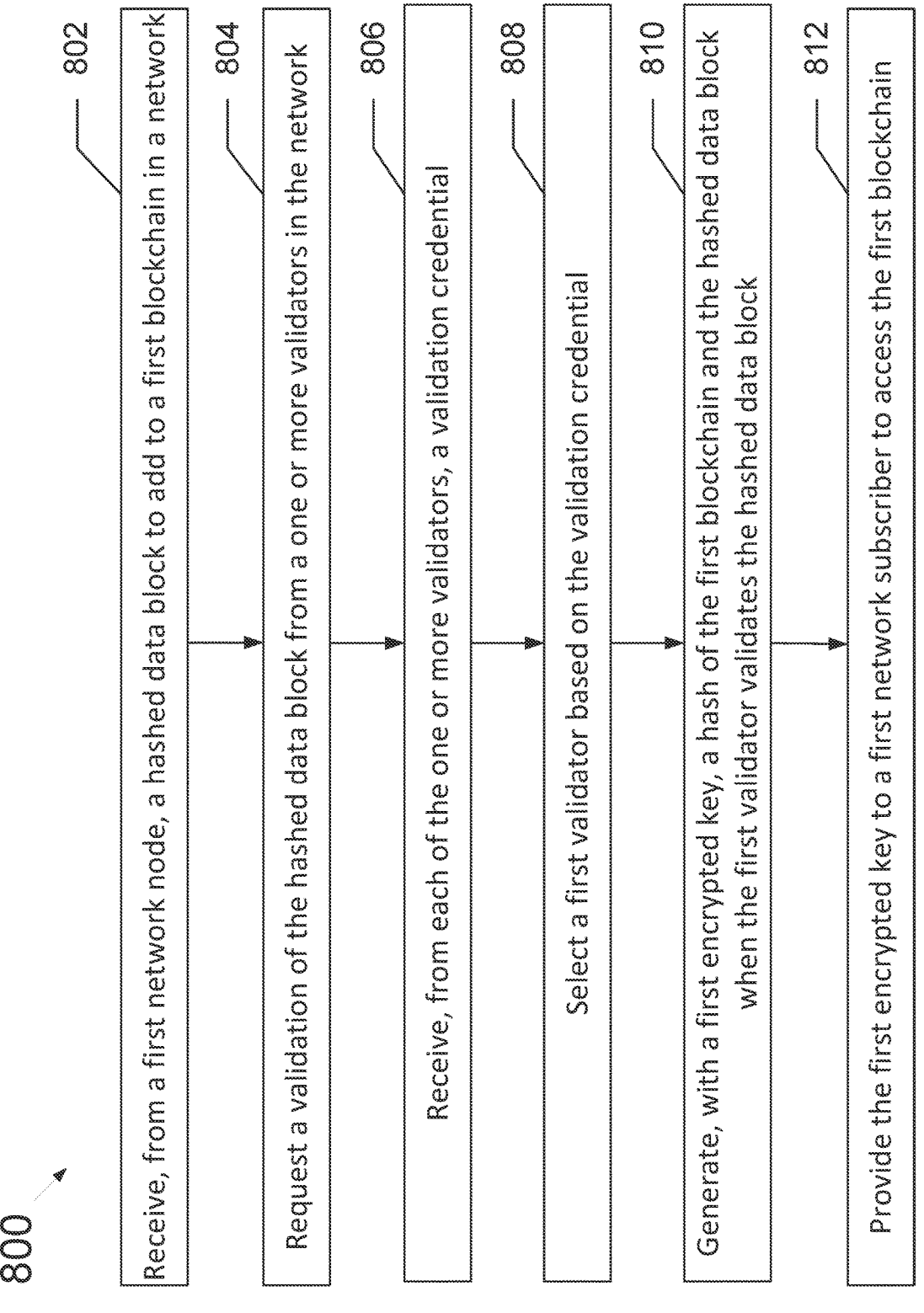

802 — Receive, from a first network node, a hashed data block to add to a first blockchain in a network 804 — Request a validation of the hashed data block from a one or more validators in the network 806 — Receive, from each of the one or more validators, a validation credential 808 — Select a first validator based on the validation credential 810 — Generate, with a first encrypted key, a hash of the first blockchain and the hashed data block when the first validator validates the hashed data block 812 — Provide the first encrypted key to a first network subscriber to access the first blockchain

CUSTOMIZED BLOCKCHAIN INFRASTRUCTURE

CROSS-REFERENCE TO RELATED APPLICATIONS

The present disclosure is related and claims priority, under 35 U.S.C. § 119(e), to U.S. Provisional Patent Application No. 63/405,322, entitled CUSTOMIZED BLOCKCHAIN INFRASTRUCTURE, to Kevin SEKNIQI et al., filed on Sep. 9, 2022, the contents of which are hereby incorporated by reference in their entirety, for all purposes.

TECHNICAL FIELD

The present disclosure generally relates to blockchain technology, and more specifically relates to customized blockchain infrastructures.

BACKGROUND

Conventional blockchain technology includes a growing list of records, called blocks, that are linked together using cryptography. Each block contains a cryptographic hash of the previous block and additional fields to modify the state of the blockchain. Such fields may include, but are not limited to: a timestamp, transaction data, concise summary of the current state (often represented as the root hash of a Merkle tree). If provided, the timestamp acts as an upper bound for the time that the block and all of its fields were published. As blocks each contain information about the block previous to it, they form a chain. Therefore, blockchains are resistant to modification of their data because once recorded, the data in any given block cannot be altered retroactively without altering all subsequent blocks. However, conventional blockchain technology is rigid, which makes it difficult to scale or otherwise customize a blockchain without either writing from scratch or making significant changes to existing implementations.

BRIEF SUMMARY

The subject disclosure provides for systems and methods for generating customized blockchain infrastructures. In an aspect, a single replicated state machine is created as a source of truth for validator sets of all subnets. The validator sets are sufficient for each set to coordinate to validate a dynamically specified blockchain definition. Additionally, these validator sets are sufficient for a set to define a customized communication protocol between different validator sets. For example, subnets include dynamic sets of validators working together to achieve consensus on a state of a set of blockchains. According to aspects, any user of a network (e.g., the AVALANCHE network) can create a subnet. This creation may result in the bonding (or burning) of a base asset (e.g., a cryptocurrency). A cost of running a subnet may be related to a number of intra and inter-subnet transactions that the subnet executes, along with a number of validators on the subnet. According to aspects, validators are specified for the subnet on the single replicated state machine. According to aspects, each subnet may utilize a common rewards module. According to aspects, the state of the subnet can be kept private. In an implementation, cross-subnet transfers can build on top of existing cross-chain interactions by utilizing threshold signature schemes (e.g., multi-signature schemes, threshold signature schemes, or other cryptographic proofs of participation).

According to one embodiment of the present disclosure, a computer-implemented method for generating a heterogeneous network of blockchains is provided. The method includes generating a platform blockchain having a single replicated state machine. The method includes generating at least one subnet based in part on the platform blockchain, the subnet including at least one blockchain, the generating causing bonding or burning of a base asset of the platform blockchain. The method includes specifying validators for the at least one subnet. The platform blockchain includes a source of truth for transactions across the subnets.

According to one embodiment of the present disclosure, a system is provided including a processor and a memory comprising instructions stored thereon, which when executed by the processor, causes the processor to perform a method for generating a heterogeneous network of blockchains. The method includes generating a platform blockchain having a single replicated state machine. The method includes generating at least one subnet based in part on the platform blockchain, the subnet including at least one blockchain, the generating causing bonding or burning of a base asset of the platform blockchain. The method includes specifying validators for the at least one subnet. The platform blockchain includes a source of truth for transactions across the subnets.

According to one embodiment of the present disclosure, a non-transitory computer-readable storage medium is provided including instructions (e.g., stored sequences of instructions) that, when executed by a processor, cause the processor to perform a method for generating a heterogeneous network of blockchains. The method includes generating a platform blockchain having a single replicated state machine. The method includes generating at least one subnet based in part on the platform blockchain, the subnet including at least one blockchain, the generating causing bonding or burning of a base asset of the platform blockchain. The method includes specifying validators for the at least one subnet. The platform blockchain includes a source of truth for transactions across the subnets.

According to one embodiment of the present disclosure, a system is provided that includes means for storing instructions, and means for executing the stored instructions that, when executed by the means, cause the means to perform a method for generating a heterogeneous network of blockchains. The method includes generating a platform blockchain having a single replicated state machine. The method includes generating at least one subnet based in part on the platform blockchain, the subnet including at least one blockchain, the generating causing bonding or burning of a base asset of the platform blockchain. The method includes specifying validators for the at least one subnet. The platform blockchain includes a source of truth for transactions across the subnets.

In yet another embodiment, a computer-implemented method for managing a blockchain network architecture includes receiving, from a first network node, a hashed data block to add to a first blockchain in a network. The computer-implemented method also includes requesting a validation of the hashed data block from a one or more validators in the network, receiving, from each of the one or more validators, a validation credential, selecting a first validator based on the validation credential, generating, with a first key, a hash of the first blockchain and the hashed data block when the first validator validates the hashed data block, and providing the first key to a first network subscriber to access the first blockchain.

BRIEF DESCRIPTION OF THE FIGURES

To easily identify the discussion of any particular element or act, the most significant digit or digits in a reference number refer to the figure number in which that element is first introduced.

FIG. 7 illustrates an example flow diagram for generating a network of blockchains, according to certain aspects of the present disclosure.

FIG. 8 illustrates an example flow diagram for managing a network of blockchains, according to certain aspects of the present disclosure.

Figure 1:
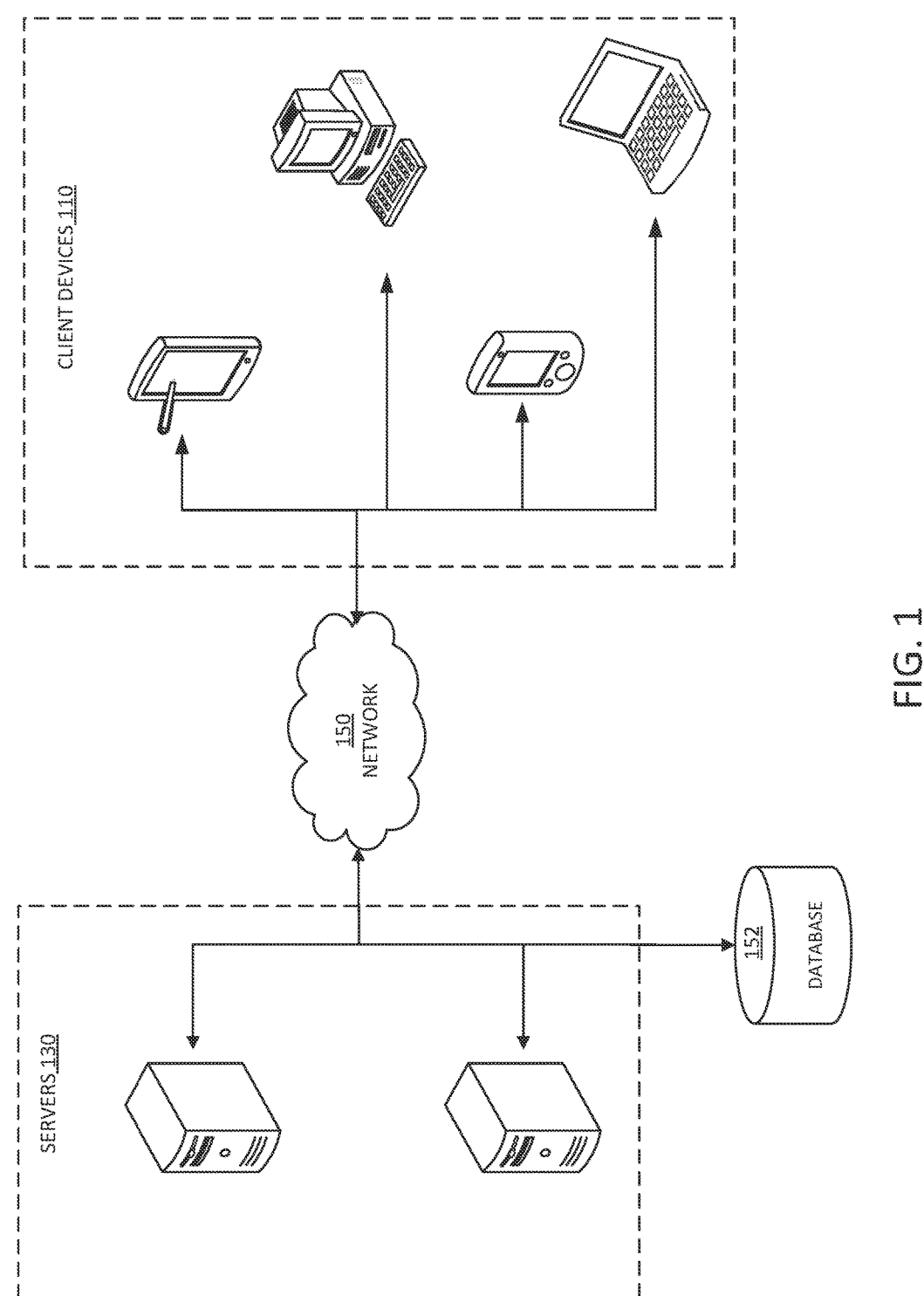
FIG. 1 illustrates a network architecture supporting an application for managing blockchain assets, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Conventional blockchain technology includes a growing list of records, called blocks, that are linked together using cryptography. Each block contains a cryptographic hash of the previous block and additional fields to modify the state of the blockchain. Such fields may include, but are not limited to: a timestamp, transaction data, concise summary of the current state (often represented as the root hash of a Merkle tree). If provided, the timestamp acts as an upper bound for the time that the block and all of its fields were published. As blocks each contain information about the block previous to it, they form a chain. Therefore, blockchains are resistant to modification of their data because once recorded, the data in any given block cannot be altered retroactively without altering all subsequent blocks. However, conventional blockchain technology is rigid, which makes it difficult to scale or otherwise customize a blockchain without either writing from scratch or making significant changes to existing implementations.

Subnets allow a network to scale beyond a single replicated state, and provide extensibility beyond conventional blockchain technology, for example, by hosting multiple blockchains with customized virtual machines. However, as these systems became popular, their validator requirements grow enormously because of the state and execution requirements. As a result, conventional blockchain approaches have various shortcomings, including execution engines having limited flexibility due to the amount of computation done. This is because validators are not able to actively choose what they are validating. Other shortcomings include limitations on a number of subnets that are supported (e.g., 100 subnets or less), no management over validator sets or rewards, requiring that virtual machines can be compiled to specific code language (e.g., WebAssembly, or WASM), and extremely limited execution engines.

The subject disclosure overcomes the above-described shortcomings by providing systems and methods for generating customized blockchain infrastructures. In an aspect, a single replicated state machine is created as a source of truth for validators of all subnets. In some embodiments, the single replicated state machine may be created as a source of truth for validators and their rewards. In some embodiments, the single replicated state machine may be created as a source of truth for cross-subnet interactions (e.g., on the platform chain) for every subnet that is being managed, guaranteeing delivery receipts for sender. For example, subnets include dynamic sets of validators working together to achieve consensus on a state of a set of blockchains. According to aspects, any user of a blockchain network as disclosed herein can create a subnet. This creation may result in the bonding (or burning) of a base asset (e.g., a cryptocurrency, or other digital asset). A cost of running a subnet may be related to a number of intra and inter-subnet transactions that the subnet executes, along with a number of validators on the subnet. According to aspects, validators are specified for the subnet on the single replicated state machine. According to aspects, each subnet may utilize a common rewards module. According to aspects, the state of the subnet can be kept private. In an implementation, cross-subnet transfers can build on top of existing cross-chain interactions by utilizing threshold signature schemes.

According to aspects, there are multiple ways of specifying who can become validators for a subnet, including, but not limited to, proof-of-stake with an asset named by the creator of the subnet, proof-of-authority with the authority being specified by the creator of the subnet, and the like. This enables all other subnets to know who the validators are of the subnet. If other subnets did not know the validators of the subnet, then they are unable to verify cross-subnet transactions.

According to aspects, each subnet may utilize a common rewards module. The common rewards module enables validators to discover the profitability of validating a subnet. This results in a significantly better validator experience for choosing which subnets to validate.

According to aspects, because the state of the subnet does not have to fit any pre-specified format, the logic that is implemented on that subnet is fully generic and can be kept private. This creates a heterogeneous network of state managers. Additionally, participants in different subnets may be required to have additional requirements in addition to the base requirements of the primary network.

According to aspects, because the subnet is capable of specifying its own logic, the fee structure may be implemented by the subnet creator (e.g., the user). In an implementation, fees may be paid in a custom asset, fees may be paid via proof-of-work, and/or any other programmable fee implementations. In an aspect, there may also be no fees.

According to aspects, the subnet does not just have to implement a consensus protocol because it makes use of existing consensus engines (e.g., provided through a software development kit (SDK)/plug-in interface). In some implementations, subnets 302 can define additionally network protocols. For example, subnets may utilize membership knowledge in lieu of, or in addition to, consensus to implement Distributed Hash Tables (DHT).

According to aspects, cross-subnet transfers can build on top of existing-cross chain interactions by utilizing threshold signature schemes. Specifically, by po sting a threshold signed transaction on a single shared state, a result of that transaction can be consumed by every chain on the network.

The disclosed system addresses a problem in traditional blockchains tied to computer technology, namely, the technical problem of providing scalability and extensibility to a blockchain. The disclosed system solves this technical problem by providing a solution also rooted in computer technology, namely, by providing systems and methods for generating customized blockchain infrastructures. The disclosed system also improves the functioning of the computer itself because it reduces the cost of system resources and improves data processing.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block and additional fields to modify the state of the blockchain. The additional fields may include, but are not limited to, a timestamp, and transaction data, and concise summary of the current state (often represented as the root hash of a Merkle tree).

As used herein, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties.

As used herein, the term "primary network" generally refers to a special subnet, which validates built-in blockchains. Members of the subnets may also be a member of the primary network. In some embodiments, a subject that is member of the primary network, stakes (e.g., acquires or "buys") one or more tokens from the primary network. As a result, blockchain validators can validate built-in blockchains on the primary network and have also staked primary network tokens.

According to aspects, subnets enable the creation of a heterogeneous network of blockchains that can communicate with each other. In embodiments as disclosed herein, numerous validators supporting different blockchains are able to interact with one another. Accordingly, a system as disclosed herein coordinates subnet interactions by learning the source of truth for the blockchain state (the validator set) and interactions of the blockchain state. In addition, the system incentivizes the subnets to economically sustain the validators.

Although both forks and subnets support a variety of underlying virtual machines (VMs) and their participants, a subnet enables interoperability of different types of virtual machines from the main network (e.g., primary network). On the other hand, forks split the network into isolated historical versions of the main network and make it difficult to maintain the code base and communicate with it. Accordingly, in some embodiments, forking is temporal, whereas subnets are spatial.

Embodiments as disclosed herein include subnets to facilitate the operation and management of customized blockchains by cutting down development time (e.g., from years to only weeks, days, or even hours depending on existing knowledge). The subnets also provide performance isolation, such that performance impacts to one of the subnets may not impact other subnets, as long as they are not communicating with one another. Subnets also allow the creator, miner, or administrator (e.g., user) to limit, manage and assign validators.

In some embodiments, a customized blockchain may include a VM marketplace having subnets serviced by unique VM modules that allow users to create feature sets directed to specific needs. For example, a gaming application in the VM marketplace will have different VM modules than a finance application.

Example System Architecture

FIG. 1 illustrates a network architecture 100 supporting an application for managing blockchain infrastructures, according to some embodiments. Servers 130 and a database 152 are communicatively coupled with client devices 110 via a network 150. Servers 130 may host applications bridging subnets and handling their assets and transactions over multiple blockchains, running in client devices 110. Client devices 110 may be used by users and administrators of the blockchains. This includes contributors to a blockchain, transaction validators, miners, parties to a smart contract, and the like. Client devices 110 may include smart phones, laptops, mobile devices, palm devices, and even desktops. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like. Database 152 may store backup files from blockchain transactions, smart contracts, signatures, and digital assets including tokens, cryptocurrencies, smart contracts, and financial data. In addition, database 152 may include encrypted keys that may be distributed to each, many, or all of the blockchain users.

Figure 2:
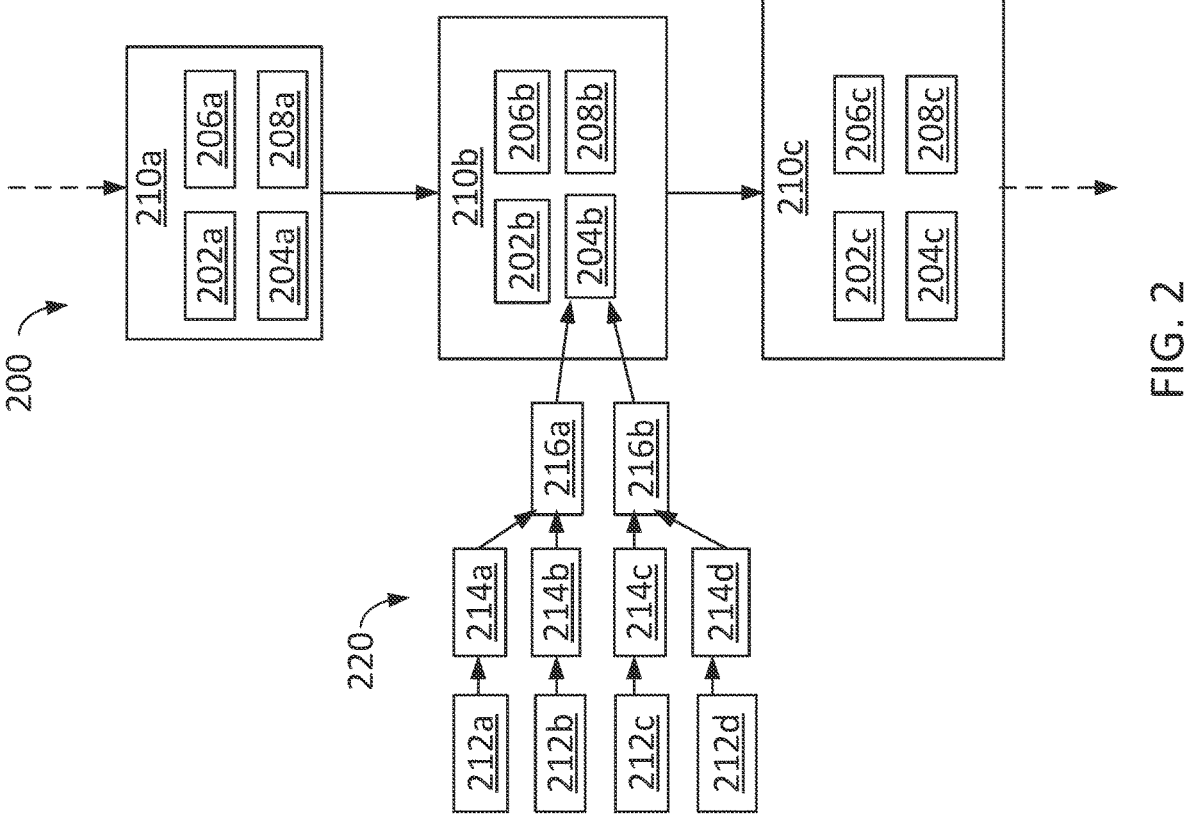
FIG. 2 illustrates an example blockchain system for practicing some implementations of the disclosure.

FIG. 2 illustrates an exemplary blockchain 200, according to certain aspects of the present disclosure. For example, the blockchain system 200 may include a primary network. As shown, the blockchain system 200 includes several blocks 210a, 210b, and 210c (hereinafter, collectively referred to as "blocks 210"). For simplicity, three blocks 210 are shown. Each block 210 includes a previous hash 202a, 202b, and 202c (hereinafter, collectively referred to as "hashes 202"), transaction roots 204*a*, 204*b*, and 204*c* (hereinafter, collectively referred to as "transaction roots 204"), timestamps 206*a*, 206*b*, and 206*c* (hereinafter, collectively referred to as "timestamps 206"), and nonces 208*a*, 208*b*, and 208*c* (hereinafter, collectively referred to as "nonces 208"). According to an aspect of the present disclosure, nonces 208 may include a 32-bit field whose value is used as a mathematical challenge to users of blockchain 200 (e.g., contributors, users, or miners) to add a new block (e.g., block 210*b*). The value of nonces 208 may be adjusted to either speed up or slow down the addition of new blocks 210. When one of the miners discovers nonce 208*b*, the value is validated by other users (e.g., nodes) each time before block 210 is added to blockchain 200.

Previous hashes 202 are values obtained by hashing a previous block 210 in blockchain system 200. For example, if block 210*b* is the Nth block in blockchain 200, then previous hash 202*b* is the value of the hash of block N–1, which in this case would be block 210*a*. Similarly, the previous hash 202*c* is the value of the hash of block 210*b*.

Transaction roots 204 are root hash values of a hash tree 220 (e.g., a Merkle tree) over all transactions 212*a*, 212*b*, 212*c*, and 212*d* (hereinafter, collectively referred to as "transactions 212") to be added to the block 210. For example, transactions 212 are to be added to block 210*b*. According to an aspect of the present disclosure, transactions 212 may be any type of transaction, and may include any type of data of any length such as photographs, videos, sound recordings, and the like. To add transactions 212 to blockchain system 200, each of transactions 212 is hashed to obtain hashed transactions 214*a*, 214*b*, 214*c*, and 214*d* (hereinafter, collectively referred to as "hashed transactions 214"). For example, hashing transaction 212*a* yields hashed transaction 214*a*, hashing transaction 212*b* yields hashed transaction 214*b*, and so on.

Hashed transactions 214 are then hashed with each other to obtain hashes 216*a* and 216*b* (hereinafter, collectively referred to as "hashes 216"). For example, hashed transaction 214*a* is hashed with hashed transaction 214*b* to obtain hash 216*a*, and hashed transaction 214*c* is hashed with hashed transaction 214*d* to obtain hash 216*b*. Finally, hash 216*a* is hashed with hash 216*b* to obtain transaction root 204*b*. It will be appreciated that although hash tree 220 for block 210*b* is shown, it is understood that transaction roots 204 of blocks 210 in blockchain 200 may include a corresponding similar hash tree 220. As a result, each of blocks 210 added to blockchain 200 is a confirmation of all the transactions that occurred before. Thus, blockchain 200 effectively is permanent and immutable. In other words, it would be computationally impractical or impossible to surreptitiously modify blocks 210 in blockchain 200 without realizing that data has been altered.

In some embodiments, hashing can be accomplished using cryptographic hash functions such as, including, but not limited to, Secure Hash Algorithm (SHA) 0, SHA-1, SHA-2, SHA-3, . . . , SHA-256, etc., or Digital Signature Hash Algorithm (DSA).

In some embodiments, blockchain 200 can include publicly distributed block headers, which is a technology known to meet the requirements of storing replicated artifacts in publicly available distributed storage facilities that cannot be tampered with, and that are readily available for inspection. According to an aspect, blockchain 200 may be a public blockchain or a private blockchain.

Figure 3:
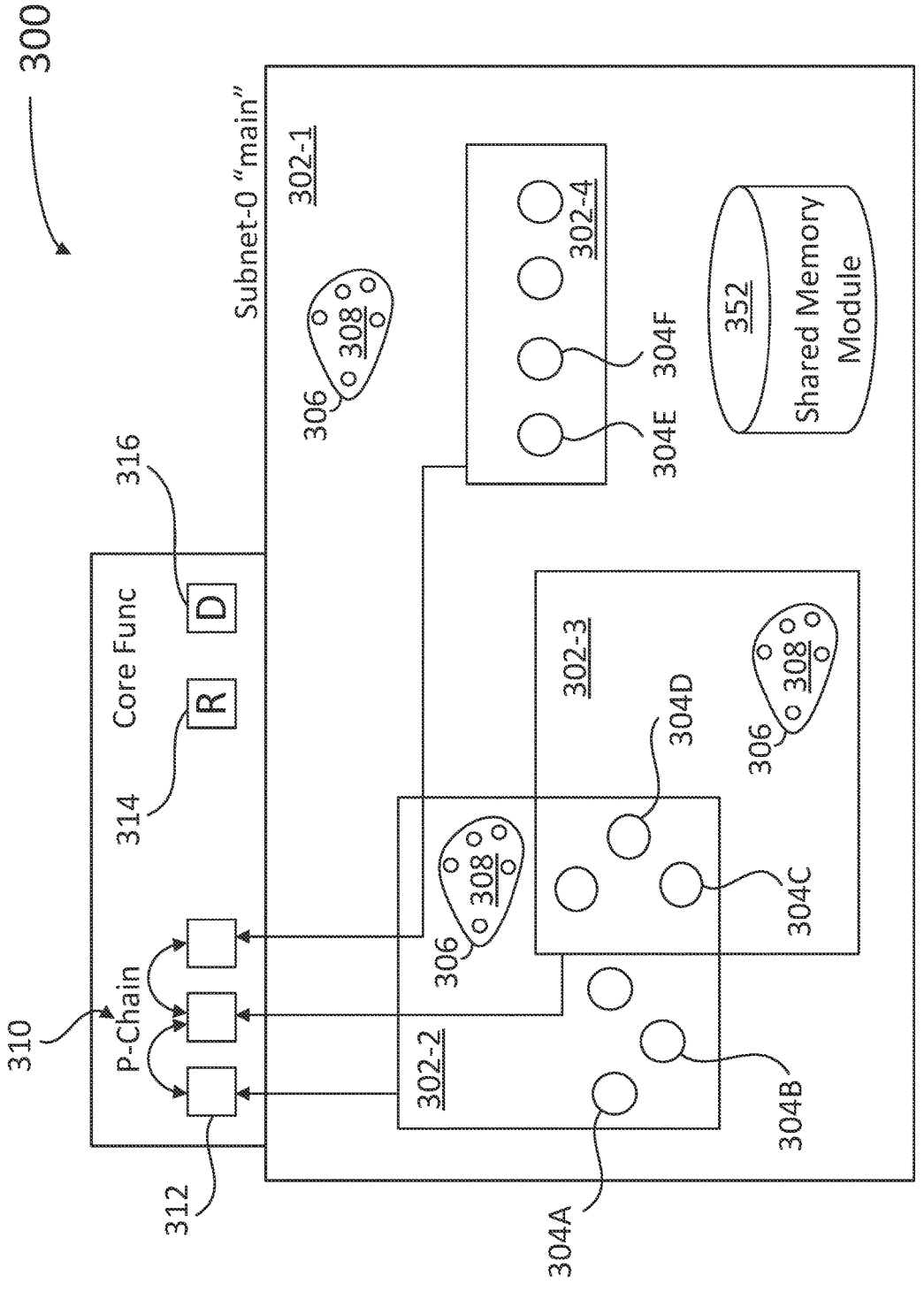
FIG. 3 illustrates a blockchain infrastructure, according to certain aspects of the present disclosure.

FIG. 3 illustrates an exemplary customized blockchain 300, according to certain aspects of the present disclosure. For example, the blockchain infrastructure 300 may include a first subnet 302-1, a second subnet 302-2, a third subnet 302-3, and a fourth subnet 302-4 (hereinafter, collectively referred to as "subnets 302"), a primary network 302-1 (e.g., "subnet 0") includes a primary network. In an implementation, the customized blockchain infrastructure 300 may be built upon any given technology stack. Each subnet 302 includes generic logic for performing transactions in blockchain 300.

In some embodiments, each subnet 302 may include multiple validators (e.g., nodes) for validating blockchain transactions. For example, second subnet 302-2 may include validators 304A, 304B, and 304C. Third subnet 302-3 may include validators 304C and 304D. Fourth subnet 302-4 may include validators 304E and 304F. As illustrated, the second subnet 302-2 and the third subnet 302-3 have validators 304C and 304D in common. Hereinafter, validators 304A, 304B, 304C, 304D, 304E, and 304F will be collectively referred to as "validators 304." In an implementation, the first subnet 302-1 may include subnets 302-2, 302-3, and 302-4. It is understood that more or less validators 304 and/or subnets 302 may be included without departing from the scope of the present disclosure. It is further understood that subnets 302 may have more or less validators 304 in common, without departing from the scope of the present disclosure.

In some embodiments, validators 304 may stake one or more native tokens 308 or assets in the subnet as guarantee for validating a transaction, e.g., a proof-of-stake (PoS) validation. Native tokens 308 are minted or generated by the creator of the associated subnet (e.g., the validator itself), and collected in an asset pool 306. In some embodiments, validators 304 include a proof-of-authority (PoA) to vouch for their validating credentials. The authority is specified by a creator of the subnet, and may include a reputable individual or network address, which is consensually recognized in the network. In some embodiments, validators 304 resolve a complex mathematical puzzle to vouch for their validating credentials, e.g., in a proof-of-work (PoW) validation.

In some embodiments, each of subnets 302 may be managed by a platform blockchain (P-Chain) 310. For example, the P-Chain 310 may track balances/transactions 312 across each of the subnets 302. The P-Chain 310 may also include core functionality, including, but not limited to, a staking module 314 and/or a rewards module 316. For example, the rewards module 316 may provide rewards based on uptime management for incentivizing users to validate a subnet. In an implementation, P-Chain 310 may be a manager of the validators of the subnets.

In some embodiments, each subnet 302 may utilize native tokens 308 to pay for transactions across subnets 302. For example, first subnet 302-1 may utilize a first virtual token, second subnet 302-2 may utilize a second virtual token, third subnet 302-3 may utilize a third virtual token, and fourth subnet 302-4 may utilize a fourth virtual token. Each of the virtual tokens may be different from each other or the same. In an implementation, the first virtual token may include a native token of the platform (e.g., cryptocurrency). In an implementation, transferring/transacting tokens between/across subnets may be managed by the P-Chain 310.

Some of subnets 302 may be high performance zones. For example, users may target performance goals without targeting the stability of the larger, customized network 300. Customized network 300 allows a tradeoff between fault tolerance, performance, and other attributes of subnets 302. In some embodiments, P-Chain 310 may perform a "sharding" process. Sharding is a process to functionally divide disparate activities or subnets allowing them to proceed in parallel. This allows different rules to be applied to different transactions.

In an implementation, one validator 304 may participate in multiple subnets. For example, validators 304 participate in at least one of subnets 302 in addition to primary network 302-1 ("subnet 0"). Or validators 304C and 304D belong in subnets 302-2 and 302-3. In this way, users may enhance the features/guarantees a subnet provides, which are otherwise more burdensome for the rest of the network. Additionally, subnets 302 may interoperate with other subnets 302.

In some embodiments, a shared memory module 352 may be utilized for data transfers across subnets 302. Entries in shared memory module 352 may be entered through P-Chain 310. For example, shared memory module 352 may re-use baked-in logic to accomplish that. In some embodiments, transactions may be injected into shared memory module 352, and an aggregated signature is published for a consensual confirmation. According to aspects, one or more subnets 302 may generate native tokens 308, stored in an asset pool 306. Accordingly, transactions across subnets 302 may include exchange and conversion of native tokens 308 (e.g., "base assets") across subnets 302.

In some embodiments, a single replicated state machine (e.g., a P-Chain 310, replicated by the entire network) may be created as a source of truth (e.g., a controller) for validators 304. In some embodiments, the single replicated state machine may be created as a source of truth for validators and their rewards. In some embodiments, the single replicated state machine may be created as a source of truth for cross-subnet interactions between one or more subnets 302. In an aspect, the replicated state may not include the state of individual subnets 302. In some embodiments, the single replicated state machine may act as a global source of truth for metadata across subnets 302.

In some embodiments, users of the primary network 302-1 can create a subnet 302. This may result in the bonding (or burning) of a base asset 308 (e.g., cryptocurrency and other native tokens). The cost of running subnets 302 may be associated with a number of transactions made, and the number of validators 304 on each subnet 302. In some embodiments, validators 304 may be specified for a subnet 302 on the single replicated state machine.

In some embodiments, the state of a subnet 302 may not fit a pre-specified format, and the logic implemented on each subnet 302 can be kept private. This creates a heterogeneous network of state managers for subnets 302. Participants in different subnets 302 may be required to have additional requirements in addition to the base requirements of the primary network 302-1. Accordingly, a subnet 302 may specify its own logic, including a fee structure. In some embodiments, fees may be paid with a native token 308, via a PoW, a PoS, and/or any other programmable fee implementations. Some transactions may be free.

In some embodiments, subnets 302 make use of existing consensus engines of one or more blockchains the subnets 302 are validating, e.g., provided through a software development kit (SDK)/plug-in interface. In some implementations, the subnets 302 can define additionally network protocols. For example, subnets may utilize membership knowledge in lieu of, or in addition to, consensus to implement DHT.

In some embodiments, subnets 302 may include at least one of a private subnet, a proof-of-authority subnet, a permissionless subnet, or a non-consensus subnet. Blockchain 300 supports cross-subnet operations such as transfer of base assets 308, generic subnet rewards, or distributing hashtags. In some embodiments, a cross-subnet transfer includes an export operation on a source subnet 302 that places digital assets 308 in shared memory module 352. An import operation in a destination subnet 302 checks and moves digital assets 308 from the shared memory module 352 to a specific blockchain. In some embodiments, at least one of subnets 302 may be interoperable with one or more other subnets 302.

Figure 4:
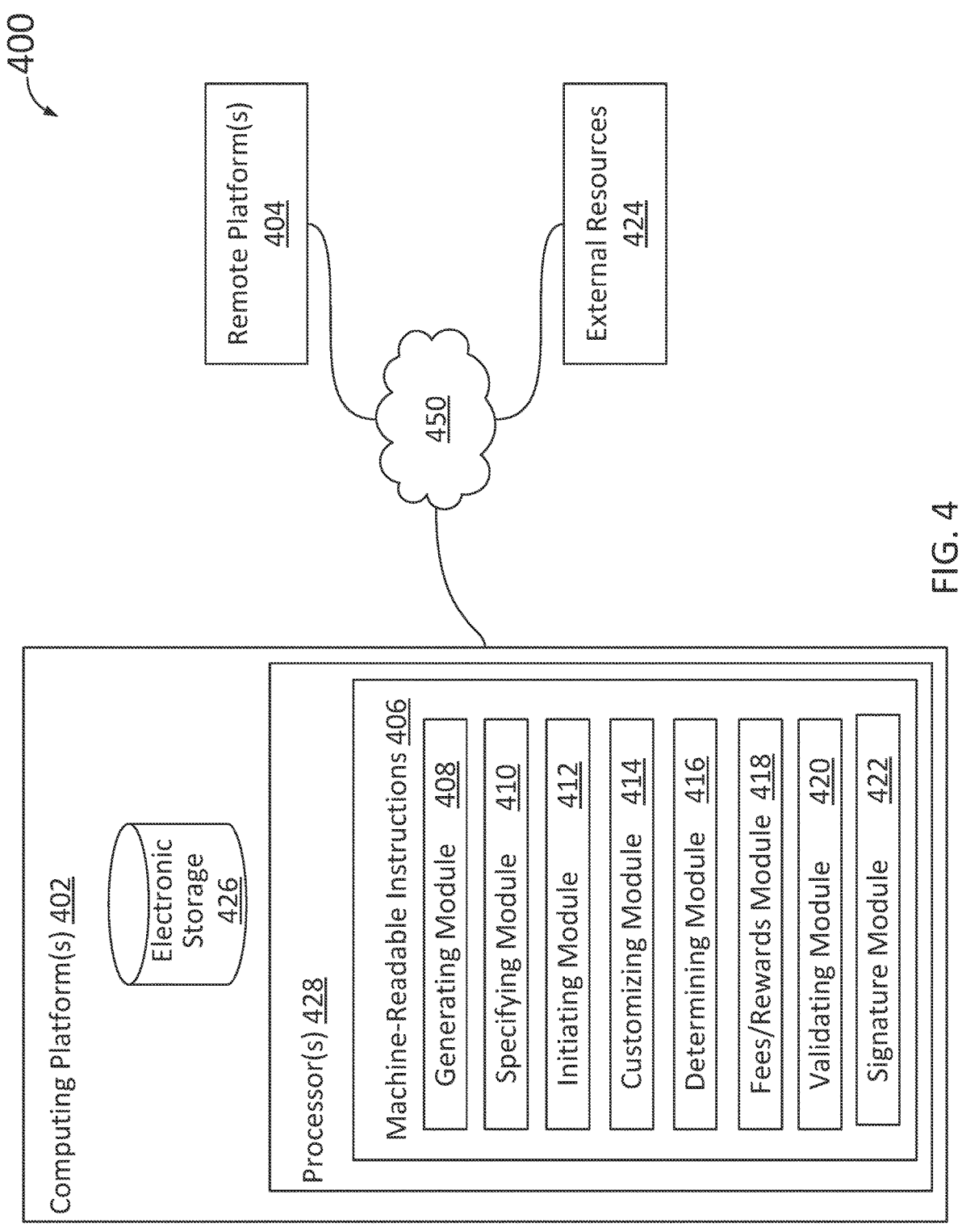
FIG. 4 illustrates a system configured for generating a heterogeneous network of blockchains, in accordance with one or more implementations.

FIG. 4 illustrates a system 400 configured for generating a heterogeneous network of blockchains coupled via a network 450, in accordance with one or more implementations. In some implementations, system 400 includes one or more computing platforms 402. Computing platform(s) 402 can be configured to communicate with one or more remote platforms 404 according to a client/server architecture, a peer-to-peer architecture, and/or other architectures. Remote platform(s) 404 can be configured to communicate with other remote platforms via computing platform(s) 402 and/or according to a client/server architecture, a peer-to-peer architecture, and/or other architectures. Users can access system 400 via remote platform(s) 404.

Computing platform(s) 402 can be configured by machine-readable instructions 406. Machine-readable instructions 406 includes one or more instruction modules. The instruction modules include computer program modules. The instruction modules include one or more of generating module 408, specifying module 410, initiating module 412, customizing module 414, determining module 416, fees/rewarding module 418, validating module 420, and/or signature module 422, and/or other instruction modules.

Generating module 408 can be configured to generate a platform blockchain including a single replicated state machine. Generating module 408 can also be configured to generate at least one subnet based in part on the platform blockchain. For example, the subnet may include at least one blockchain. The generating module 408 may also cause bonding or burning of a base asset of the platform blockchain.

Specifying module 410 can be configured to specify validators for the at least one subnet. In some embodiments, system 400 may include a source of truth for transactions across the subnets (e.g., main subnet 302-1).

Initiating module 412 can be configured to initiate at least one transaction from the at least one subnet to another subnet of the platform blockchain.

Customizing module 414 can be configured to customize the subnet by a creator of the subnet by specifying a virtual machine that implements the replicated state machine for the subnet.

Determining module 416 can be configured to determine a fee structure for the subnet and implement the fee structure by a creator of the subnet. According to aspects, the virtual machine implements a fee structure for its own application specific purposes.

Fees/Rewards module 418 can be configured to reward participants based on implementation of a fee structure defined by a creator of the subnet. Rewarding module 418 may include a fee structure to discourage participants from creating a copy of the main network code and initiating communication via cumbersome bridges. Rather, participants would be incentivized to create their own subnets instead. In some embodiments, fees/rewards module 418 enables validators to discover the profitability of validating a subnet. This results in a significantly better validator experience for choosing which subnets to validate. Fees/rewards module 418 may include a fee structure to combine/choose from the following schemes: 1) introduce feeless transactions that may utilize proof-of-work (PoW), 2) periodically charge for running a subnet paid in the native token of the subnet, or 3) tax the subnet in a native token (e.g., a cryptocurrency) for each invocation of platform functionality, such as staking reward determination, e.g., platform chain consensus with preference. In an implementation, the taxation is done by paying for each unique transaction in P-Chain. The fee collected from any of the above processes could be potentially redistributed to other subnets on the platform (e.g., the primary network).

In some embodiments, fees/rewards module 418 may tax usage of key platform functionalities. For example, the platform may include sophisticated mechanisms for rewarding users based on uptime. In an implementation, rewards may happen outside the VM, on a primary blockchain network. Because there is overhead for the P-Chain to reward validators based on sub-validation duration, every validator to be awarded may be enforced on the P-Chain, and subnets may pay more native tokens to accomplish that. In some embodiments, a subnet interfaces with fees/rewards module 418 to reward users.

A validating module 420 enables other subnets to know the validators in other subnets, by publishing the validator list (e.g., network addresses). This enables other subnets to verify cross-subnet transactions.

A signature module 422 generates keys for verifying transactions over multiple parties in a heterogeneous blockchain network (e.g., subnets, miners, users, contributors, validators, and the like), as disclosed herein. Accordingly, signature module 422 provides the generated keys to selected parties, for authorization and validation of a transaction (e.g., a smart contract, an asset transfer, a cross-subnet transaction, a block addition, and the like). In some embodiments, signature module 422 provides a threshold signature scheme (TSS) to distribute the key generation and signing across the selected parties. In a TSS, once a pre-determined threshold of the selected parties has signed, the verification proceeds to approve the transaction. A TSS as disclosed herein avoids a single-point-of-failure in blockchain networks as disclosed herein. TSS may include, but is not limited to, multi-signature schemes, threshold signature schemes, or other cryptographic proofs of participation.

In some implementations, computing platform(s) 402, remote platform(s) 404, and/or external resources 424 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which computing platform(s) 402, remote platform(s) 404, and/or external resources 424 can be operatively linked via some other communication media.

A given remote platform 404 includes one or more processors configured to execute computer program modules. The computer program modules can be configured to enable an expert or user associated with the given remote platform 404 to interface with system 400 and/or external resources 424, and/or provide other functionality attributed herein to remote platform(s) 404. By way of non-limiting example, a given remote platform 404 and/or a given computing platform 402 includes one or more of a server, a desktop computer, a laptop computer, a handheld computer, a tablet computing platform, a NetBook, a Smartphone, a gaming console, and/or other computing platforms.

External resources 424 includes sources of information outside of system 400, external entities participating with system 400, and/or other resources. In some implementations, some or all of the functionality attributed herein to external resources 424 can be provided by resources included in system 400.

Computing platform(s) 402 include(s) electronic storage 426, one or more processors 428, and/or other components. Computing platform(s) 402 include(s) communication lines, or ports to enable the exchange of information with a network and/or other computing platforms. Illustration of computing platform(s) 402 is not intended to be limiting. Computing platform(s) 402 include(s) a plurality of hardware, software, and/or firmware components operating together to provide the functionality attributed herein to computing platform(s) 402. For example, computing platform(s) 402 can be implemented by a cloud of computing platforms operating together as computing platform(s) 402.

Electronic storage 426 can include non-transitory storage media that electronically stores information. The electronic storage media of electronic storage 426 includes one or both of system storage that is provided integrally (e.g., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 includes one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 includes one or more virtual storage resources (e.g., cloud storage, a virtual private network, and/or other virtual storage resources). Electronic storage 426 can store software algorithms, information determined by processor(s) 428, information received from computing platform(s) 402, information received from remote platform(s) 404, and/or other information that enables computing platform(s) 402 to function as described herein.

Processor(s) 428 can be configured to provide information processing capabilities in computing platform(s) 402. As such, processor(s) 428 includes one or more of a digital processor, an analog processor, a digital circuit designed to process information, an analog circuit designed to process information, a state machine, and/or other mechanisms for electronically processing information. Although processor(s) 428 is shown as a single entity, this is for illustrative purposes only. In some implementations, processor(s) 428 includes a plurality of processing units. These processing units can be physically located within the same device, or processor(s) 428 can represent processing functionality of a plurality of devices operating in coordination. Processor(s) 428 can be configured to execute modules 408, 410, 412, 414, 416, 418, 420, and/or 422, and/or other modules. Processor(s) 428 can be configured to execute modules 408, 410, 412, 414, 416, 418, 420, and/or 422, and/or other modules by software, hardware, firmware, some combination of software, hardware, and/or firmware, and/or other mechanisms for configuring processing capabilities on processor(s) 428. As used herein, the term "module" can refer to any component or set of components that perform the functionality attributed to the module. This includes one or more physical processors during execution of processor readable instructions, the processor readable instructions, circuitry, hardware, storage media, or any other components.

It should be appreciated that although modules 408, 410, 412, 414, 416, 418, 420, and/or 422 are illustrated as being implemented within a single processing unit, in implementations in which processor(s) 428 includes multiple processing units, one or more of modules 408, 410, 412, 414, 416, 418, 420, and/or 422 can be implemented remotely from the other modules. The description of the functionality provided by the different modules 408, 410, 412, 414, 416, 418, 420, and/or 422 described below is for illustrative purposes, and is not intended to be limiting, as any of modules 408, 410, 412, 414, 416, 418, 420, and/or 422 can provide more or less functionality than is described. For example, one or more of modules 408, 410, 412, 414, 416, 418, 420, and/or 422 can be eliminated, and some or all of its functionality can be provided by other ones of modules 408, 410, 412, 414, 416, 418, 420, and/or 422. As another example, processor(s) 428 can be configured to execute one or more additional modules that can perform some or all the functionality attributed below to one of modules 408, 410, 412, 414, 416, 418, 420, and/or 422.

The techniques described herein can be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5A:
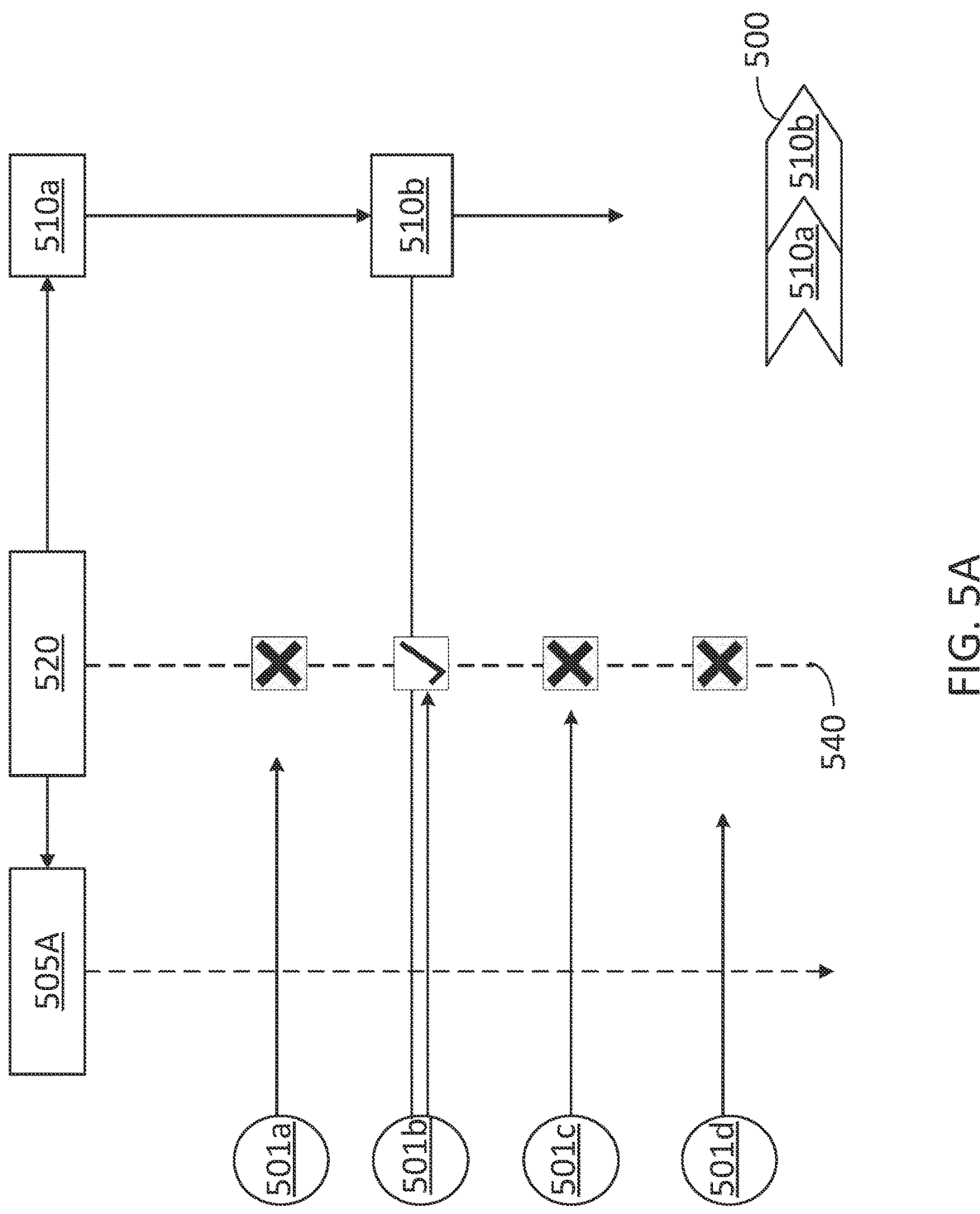
FIGS. 5A-5B illustrate proof-of-work and proof-of-stakes processes for adding and validating a block in a blockchain that is part of a customized blockchain network, according to some embodiments.
Figure 5B:
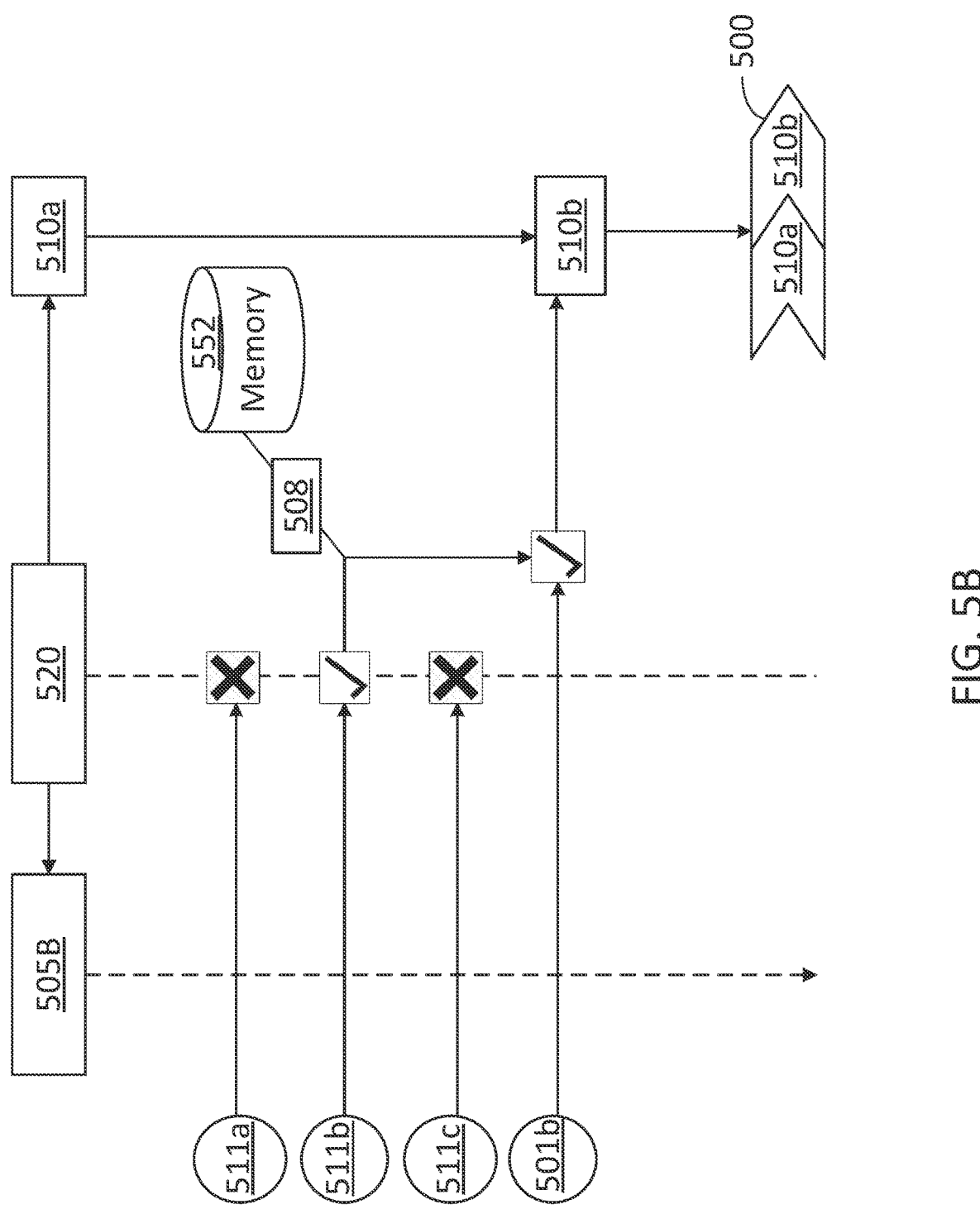

FIGS. 5A-5B illustrate proof-of-work (PoW) 505A and proof-of-stakes (PoS) 505B processes (hereinafter, collectively referred to as "processes 505") for validating a block 510b in a blockchain 500 that is part of a customized blockchain network, according to some embodiments. Processes 505 are issued by a validating module 520. Blockchain 500 includes a previous block 510a, and multiple contributors 501a, 501b, 501c, and 501d (hereinafter, collectively referred to as "miners 501"), who bid in a desire to add block 510b. Block 510b may include the newest batch of data or transactions in blockchain 500. The system includes a validating module 520 to supervise and validate the bidding of miners 501.

In some embodiments, a blockchain network includes a competitive validation method to confirm transactions and add a new block 510b to blockchain 500. Accordingly, validating module 520 issues a PoW 505A challenge to miners 501. PoW 505A may include a complicated mathematical puzzle for miners 501 to resolve within a specific timeline 540 (cf., nonces 108). The winner of this race (e.g., miner 501b) is selected to add block 510b to blockchain 500.

In some embodiments, a reward may be issued to miner 501b for adding block 510b to blockchain 500. The reward may include monetary fees or other incentives that may be spent either within or outside of blockchain 500. PoW 505A maintains fairness of reward distribution and ensures the integrity of blockchain 500. Although a PoW mechanism has been described, some embodiments may include other distributed consensus protocols for authorizing contributors and assigning validators.

FIG. 5B includes a PoS process 505B for approving a validator 511b from among validators 511a, 511b, and 511c (hereinafter, collectively referred to as "validators 511"). There are multiple ways for validating module 520 to specify which one of validators 511 may be selected. POS 505B includes verifying an asset or token in each of validators 511. This could include reviewing an asset pool of native tokens for a subnet associated with validator 511 (e.g., asset pools 306 and native tokens 308 in subnets 302). In some embodiments, process 505B may include a proof-ofauthority (PoA), wherein validating module 520 verifies an authority specified by the creator of the subnet.

In some embodiments, proof-of-stake (PoS) process 505B utilizes randomly selected miners to validate transactions. In some embodiments, a PoS process 505B may include a set of nodes (e.g., stakers) that have decided to stake their own cryptocurrencies (e.g., virtual currency/currencies) for a transaction validation. The larger the amount of stake and the longer the duration of the stake, the better the chances are of the staker receiving responsibility for validating the transaction from validating module 520.

As a safeguard against fraud, in some embodiments, PoS process 505B requires traders to "stake" a cryptocurrency value 508 (e.g., assets) as collateral, which is then locked up in a memory 552 (cf. shared memory module 352). When block 510b approved by validator 511b is deemed to be invalid by other validators (e.g., 511a and 511c), validator 511b can lose a portion of value 508.

Some embodiments may include a lower limit to how much validators 511 can stake in value 508. After the limit is surpassed, validators 511 can stake as much as they want. In some embodiments, validating module 520 is more likely to select validator 511b the higher the value 508. For example, if ten validators make a bid to validate blockchain transaction making equal stakes, each have an equal 10% chance of being selected by validating module 520, all other considerations being equal.

Figure 6:
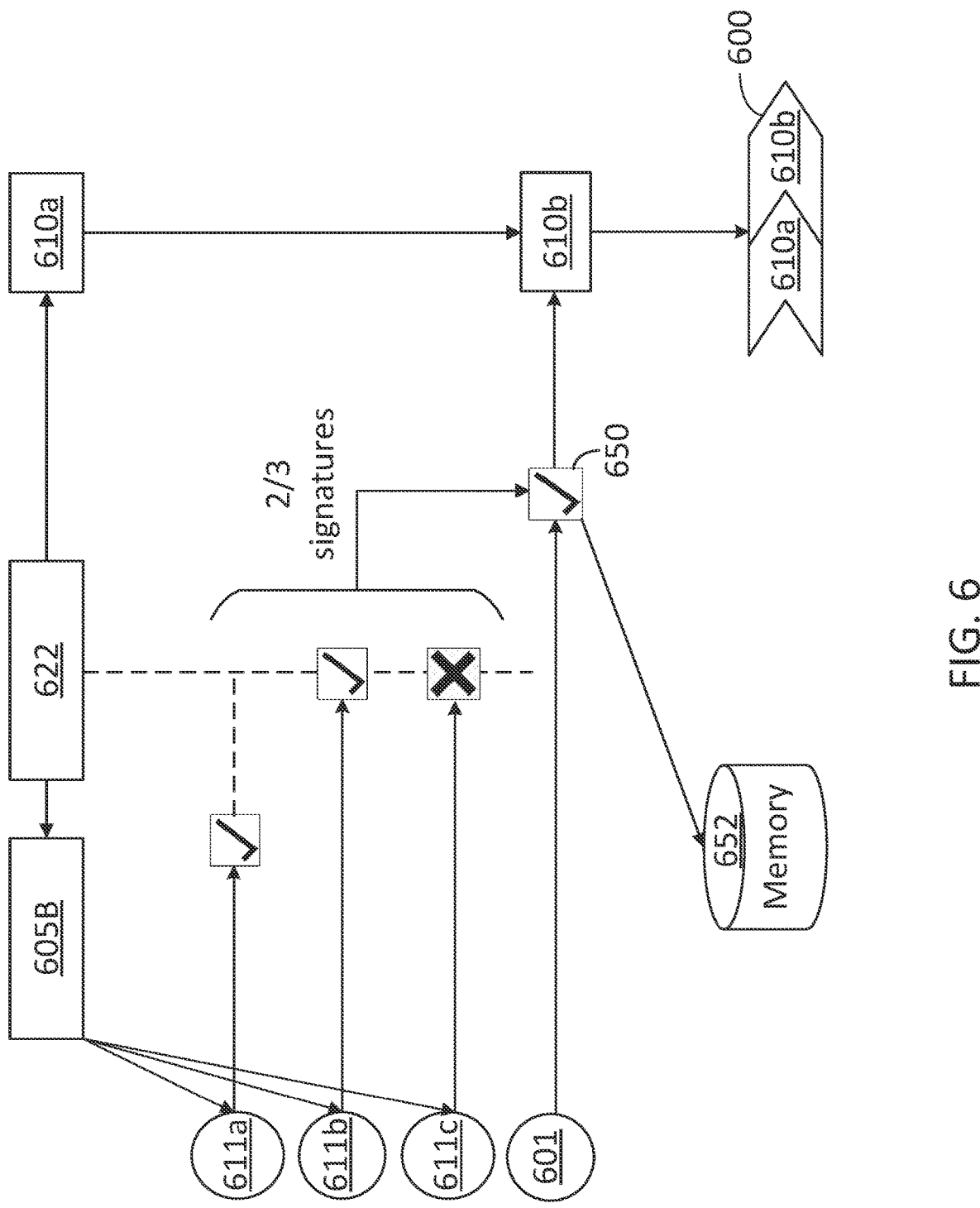
FIG. 6 illustrates a threshold signature scheme (TSS) for generating a digital signature from multiple participants in a customized blockchain, according to some embodiments.

FIG. 6 illustrates a threshold signature scheme (TSS) conducted by a signature module 622 for generating a digital signature 650 for a transaction from multiple participants 611a, 611b, and 611c (hereinafter, collectively referred to as "participants 611") in a blockchain 600, according to some embodiments. In some embodiments, the transaction may include the addition of a block 610b in blockchain 600 from a contributor 601. Participants 611 may be validators (cf. validators 304), miners, or contributors to blockchain 600.

Signature module 622 provides portions of a key 605B to each of participants 611. When a pre-selected threshold number of participants (e.g., two out of three) returns a signed portion, signature module 622 completes a signature 650. The transaction (e.g., addition of a new block 610b to existing block 610a in blockchain 600, approval of a smart contract, and the like) is completed, and blockchain 600 updated accordingly.

More generally, the transaction may include any transfer of assets across different subnets in a blockchain infrastructure as disclosed herein (cf. subnets 302). Specifically, signature module 622 may post a threshold signed transaction on a single shared state, and a result of that transaction can be consumed by one or more blockchains on the network via access to signature 650 from memory 652 (cf. shared memory module 352).

FIG. 7 illustrates an example flow diagram (e.g., process 700) for generating a network of blockchains, according to certain aspects of the disclosure. For explanatory purposes, the example process 700 is described herein with reference to FIGS. 1-4. For example, at least one or more steps in method 700 may be performed by a computer platform including an electronic storage and one or more processors executing machine-readable instructions and communicatively coupled with a remote platform and external resources via a network (cf. computing platform 402, processors 428, machine-readable instructions 406, remote platform 404, external resources 424, and network 450). In addition, the machine-readable instructions may be part of a generating module, a specifying module, an initiating module, a customizing module, a determining module, a fees/rewards module, a validating module, and a signature module, as disclosed herein (cf. generating module 408, specifying module 410, initiating module 412, customizing module 414, determining module 416, fees/rewards module 418, validating module 420, and signature module 422). Further for explanatory purposes, the steps of the example process 700 are described herein as occurring in serial, or linearly. However, multiple instances of the example process 700 may occur in parallel. Moreover, in embodiments consistent with the present disclosure, at least one or more steps in method 700 may be executed in a different order, simultaneously, quasi-simultaneously, or overlapping in time.

At step 702, a platform blockchain is generated that includes a single replicated state machine. In some embodiments, step 702 includes generating a platform blockchain (e.g., P-Chain 410) that includes a single replicated state machine.

At step 704, at least one subnet is generated (e.g., via generating module 408) based in part on the platform blockchain. For example, the subnet includes at least one blockchain, or the base blockchain. In some embodiments, step 704 may also include bonding or burning of a base asset of the platform blockchain. In some embodiments, step 704 includes generating at least one subnet (e.g., subnets 302) based in part on the platform blockchain. For example, the subnet may include at least one blockchain (e.g., blockchain 200). In some embodiments, step 704 further includes customizing the subnet by a creator of the subnet by specifying a virtual machine that implements the replicated state machine for the subnet. In some embodiments, the subnet includes at least one of a private subnet, a proof-of-authority subnet, a permissionless subnet, or a non-consensus subnet, and step 704 may include performing a cross-subnet transfer, performing generic subnet rewards, or distributing hashtags among subnets.

At step 706, validators are specified for the at least one subnet. According to aspects, the platform blockchain includes a source of truth for transactions across the subnets. In some embodiments, step 706 includes minting, with the validators, a virtual currency. In some embodiments, step 706 includes providing the virtual currency as a PoW or a PoS for qualifying as a validator for a blockchain transaction. In some embodiments, step 706 includes specifying validators (e.g., validators 304A, 304B, 304C, 304D, 304E, 304F) for the at least one subnet. According to aspects, the platform blockchain includes a source of truth for transactions across the subnets.

Step 708 includes initiating at least one transaction from at least one subnet to another subnet of the platform blockchain. The platform blockchain includes a source of truth for transactions across the subnets. In some embodiments, step 708 further includes initiating at least one transaction from the at least one subnet to another subnet of the platform blockchain. In some embodiments, step 708 further includes determining a fee structure for a subnet and implementing the fee structure by a creator of the subnet. For example, participants may be rewarded based on implementation of the fee structure defined by the creator of the subnet. According to aspects, the virtual machine implements a fee structure for its own application specific purposes.

In some embodiments, step 708 includes performing a cross-subnet transfer via inter-subnet communication. In some embodiments, step 708 includes exporting a digital asset from a source subnet into a database, and importing the digital asset from the database into a destination subnet that checks and places the digital asset in a specific blockchain.

FIG. 8 illustrates an example flow diagram (e.g., process 800) for managing a network of blockchains, according to certain aspects of the disclosure. For explanatory purposes, the example process 800 is described herein with reference to FIGS. 1-4. For example, at least one or more steps in method 800 may be performed by a computer platform including an electronic storage and one or more processors executing machine-readable instructions and communicatively coupled with a remote platform and external resources via a network (cf. computing platform 402, processors 428, machine-readable instructions 406, remote platform 404, external resources 424, and network 450). In addition, the machine-readable instructions may be part of a generating module, a specifying module, an initiating module, a customizing module, a determining module, a fees/rewards module, a validating module, and a signature module, as disclosed herein (cf. generating module 408, specifying module 410, initiating module 412, customizing module 414, determining module 416, fees/rewards module 418, validating module 420, and signature module 422). Further for explanatory purposes, the steps of the example process 800 are described herein as occurring in serial, or linearly. However, multiple instances of the example process 800 may occur in parallel. Moreover, in embodiments consistent with the present disclosure, at least one or more steps in method 800 may be executed in a different order, simultaneously, quasi-simultaneously, or overlapping in time.

Step 802 includes receiving, from a first network node, a hashed data block to add to a first blockchain in a network.

Step 804 includes requesting a validation of the hashed data block from a one or more validators in the network.

Step 806 includes receiving, from each of the one or more validators, a validation credential.

Step 808 includes selecting a first validator based on the validation credential. In some embodiments, step 808 includes providing a first version of the first key to the first validator. The first key may define, for example, access controls for viewing and/or accessing a subnet or the first blockchain (as such, keeping the blockchain state private). The first key may be an encrypted key. In some embodiments, step 808 includes providing an encrypted identifier to each of the one or more validators, and the validation credential is indicative that the first validator resolved the encrypted identifier within a pre-determined time period. In some embodiments, the validation credential is an asset from each of the one or more validators, and step 808 includes identifying a highest value asset from the one or more validators. In some embodiments, the validation credential is an authority selected by each of the one or more validators, and selecting the first validator comprises identifying the authority having a highest consensual approval from the one or more validators.

Step 810 includes generating, with the first key, a hash of the first blockchain and the hashed data block when the first validator validates the hashed data block. In some embodiments, step 810 includes rejecting the hashed data block when the first validator invalidates the hashed data block. In some embodiments, step 810 includes rewarding the first validator with a blockchain asset when the first blockchain is consensually approved by the one or more validators. In some embodiments, step 810 includes taxing the first validator a blockchain asset when the first blockchain is rejected by a pre-selected threshold number of the one or more validators.

Step 812 includes providing the first key to a first network subscriber to access the first blockchain. In some embodiments, step 812 includes providing, to each of the one or more validators, a different portion of an encrypted signature to approve a blockchain transaction, and approving the blockchain transaction when a threshold number of the one or more validators has signed the different portion of the encrypted signature. In some embodiments, step 812 further includes receiving, from a second network node, a hashed data block to add to a second blockchain in the network, generating, with a second key, a hash of the second blockchain and the hashed data block when a second validator validates the hashed data block, providing the second key to a second network subscriber to access the second blockchain, and preventing the first network subscriber to access the second blockchain. In some embodiments, the second key defines, for example, access controls for viewing and/or accessing the second blockchain. The second key may be an encrypted key In some embodiments, step 812 further includes receiving, from a second network node, a request for a transaction with the first network node, approving the transaction when a second validator validates the transaction, and adding a hashed block that includes the transaction, to the first blockchain.

Hardware Overview

Figure 9:
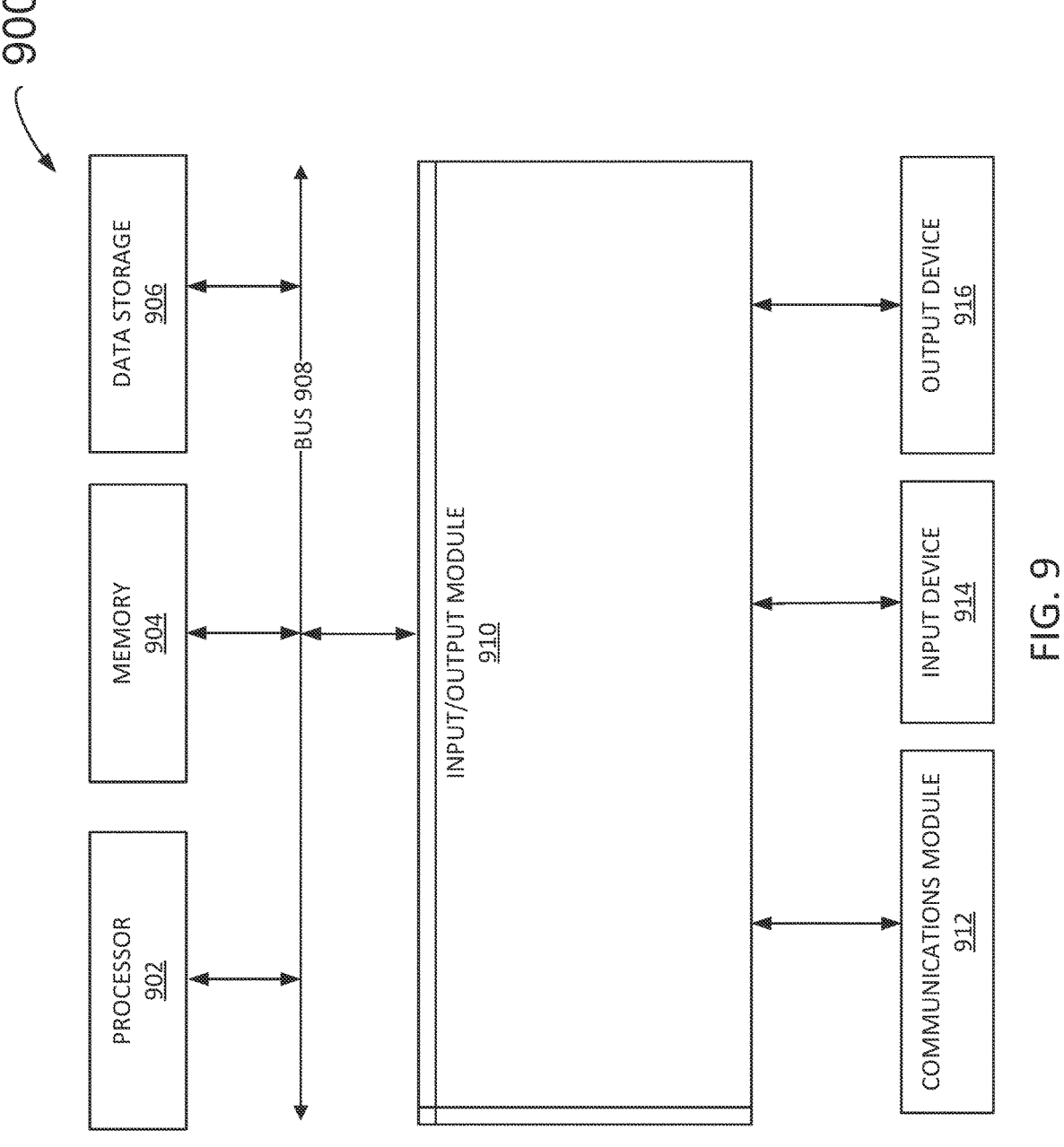
FIG. 9 is a block diagram illustrating an example computer system (e.g., representing both client and server) with which aspects of the subject technology can be implemented.

FIG. 9 is a block diagram illustrating an exemplary computer system 900 with which aspects of the subject technology can be implemented. In certain aspects, the computer system 900 may be implemented using hardware or a combination of software and hardware, either in a dedicated server, integrated into another entity, or distributed across multiple entities.

Computer system 900 (e.g., server and/or client) includes a bus 908 or other communication mechanism for communicating information, and a processor 902 coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as an LCD (liquid crystal display) monitor, for displaying information to the user.

According to one aspect of the present disclosure, the above-described gaming systems can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in the main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 900 reads data, information may be read from the data and stored in a memory device, such as the memory 904. Additionally, data from the memory 904 servers accessed via a network, the bus 908, or the data storage 906 may be read and loaded into the memory 904. Although data is described as being found in the memory 904, it will be understood that data does not have to be stored in the memory 904 and may be stored in other memory accessible to the processor 902 or distributed among several media, such as the data storage 906.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results.

The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for generating a heterogeneous network of blockchains, comprising:
    generating a platform blockchain comprising a replicated state machine;
    generating a subnet based in part on the platform blockchain, the subnet comprising at least one blockchain, the generating the subnet causing bonding or burning of a base asset of the platform blockchain, the generating the subnet comprising customizing the subnet, the customizing specifying a virtual machine that implements the replicated state machine for the subnet; and
    specifying validators for the subnet, wherein the platform blockchain comprises a source of truth for a transaction between the subnet and a second subnet of the platform blockchain.

2. The computer-implemented method of claim 1, wherein the subnet comprises at least one of a private subnet, a proof-of-authority subnet, a permissionless subnet, and a non-consensus subnet.

3. The computer-implemented method of claim 1, further comprising:
    initiating at least one transaction from the subnet to the second subnet of the platform blockchain.

4. The computer-implemented method of claim 1, wherein the validators comprise proof-of-stake validators including an asset named by a creator of the subnet.

5. The computer-implemented method of claim 1, wherein the validators comprise proof-of-authority validators, and wherein authority is specified by a creator of the subnet.

6. The computer-implemented method of claim 1, wherein the subnet is configured to provide rewards to users.

7. The computer-implemented method of claim 1, wherein the validators of the subnet perform minting of a virtual currency via proof-of-work.

8. The computer-implemented method of claim 1, further comprising:
    determining a fee structure for the subnet; and
    implementing the fee structure by a creator of the subnet.

9. The computer-implemented method of claim 1, wherein inter-subnet communication is utilized to perform a cross-subnet transfer, wherein the cross-subnet transfer comprises an export operation on a source subnet that places one or more digital assets into a database, and an import operation on a destination subnet that checks and moves the one or more digital assets from the database to a specific blockchain.

10. A system for generating a heterogeneous network of blockchains, comprising:
    a processor; and
    a memory comprising instructions stored thereon, which when executed by the processor, causes the processor to perform:
        generating a platform blockchain comprising a replicated state machine;
        generating a subnet based in part on the platform blockchain, the subnet comprising at least one blockchain, the generating the subnet causing bonding or burning of a base asset of the platform blockchain, the generating the subnet comprising customizing the subnet, the customizing specifying a virtual machine that implements the replicated state machine for the subnet; and
        specifying validators for the subnet, wherein the platform blockchain comprises a source of truth for a transaction between the subnet and a second subnet of the platform blockchain.

11. The system of claim 10, wherein the subnet comprises at least one of a private subnet, a proof-of-authority subnet, a permissionless subnet, and a non-consensus subnet.

12. The system of claim 10, further comprising stored sequences of instructions, which when executed by the processor, cause the processor to perform:
    initiating at least one transaction from the subnet to the second subnet of the platform blockchain.

13. The system of claim 10, wherein the validators comprise proof-of-stake validators including an asset named by a creator of the subnet.

14. The system of claim 10, wherein the validators comprise proof-of-authority validators, and wherein authority is specified by a creator of the subnet.

15. The system of claim 10, wherein the subnet is configured to provide rewards to users.

16. The system of claim 10, wherein the validators of the subnet perform minting of a virtual currency via proof-of-work.

17. The system of claim 10, further comprising stored sequences of instructions, which when executed by the processor, cause the processor to perform:
    determining a fee structure for the subnet; and
    implementing the fee structure by a creator of the subnet.

18. A non-transitory computer-readable storage medium comprising instructions stored thereon, which when executed by one or more processors, cause the one or more processors to perform a method for generating a heterogeneous network of blockchains, the method comprising:
    generating a platform blockchain comprising a replicated state machine;
    generating a subnet based in part on the platform blockchain, the subnet comprising at least one blockchain, the generating the subnet causing bonding or burning of a base asset of the platform blockchain, the generating the subnet comprising customizing the subnet, the customizing specifying a virtual machine that implements the replicated state machine for the subnet; and
    specifying validators for the subnet, wherein the platform blockchain comprises a source of truth for a transaction between the subnet and a second subnet of the platform blockchain.

* * * * *